(12) United States Patent
Park et al.

(10) Patent No.: US 8,787,656 B2
(45) Date of Patent: Jul. 22, 2014

(54) METHOD AND APPARATUS FOR FEATURE-BASED STEREO MATCHING

(75) Inventors: Jun Seok Park, Daejeon (KR); Eun Jin Koh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 199 days.

(21) Appl. No.: 13/413,170

(22) Filed: Mar. 6, 2012

(65) Prior Publication Data

US 2012/0237114 A1    Sep. 20, 2012

(30) Foreign Application Priority Data

Mar. 16, 2011    (KR) .......................... 10-2011-0023400

(51) Int. Cl.
*G06K 9/00*    (2006.01)
(52) U.S. Cl.
USPC .......................................................... 382/154
(58) Field of Classification Search
USPC ................... 382/154, 299; 348/42, 47, 48, 50
See application file for complete search history.

(56) References Cited

U.S. PATENT DOCUMENTS

| | | | | |
|---|---|---|---|---|
| 5,764,871 A | * | 6/1998 | Fogel | 345/427 |
| 6,046,763 A | * | 4/2000 | Roy | 348/47 |
| 6,847,728 B2 | * | 1/2005 | Tao et al. | 382/106 |
| 7,085,409 B2 | * | 8/2006 | Sawhney et al. | 382/154 |

FOREIGN PATENT DOCUMENTS

| | | |
|---|---|---|
| KR | 10-2001-0084212 | 7/2003 |
| KR | 10-2008-0089691 | 10/2008 |
| KR | 10-2009-0014532 | 2/2009 |
| KR | 10-2009-0055803 | 6/2009 |
| KR | 10-2009-0065214 | 6/2009 |

OTHER PUBLICATIONS

Lucas, et al. (An Iterative Image Registration Technique with an Application to Stereo Vision),pp. 121-130, 1981.*
Kunii, et al. (Automatic Stereo Matching Using Optical Flow for 3D Object Modeling), pp. 459-465, 2000.*
Hatzitheodorou, et al. (Stereo Matching Using Optic Flow), pp. 251-266, 2000.*

* cited by examiner

*Primary Examiner* — Daniel Mariam
(74) *Attorney, Agent, or Firm* — Staas & Halsey LLP

(57) ABSTRACT

Disclosed are a method and apparatus for feature-based stereo matching. A method for stereo matching of a reference image and at least one comparative image captured by at least two cameras from different points of view using a computer device includes collecting the reference image and the at least one comparative image, extracting feature points from the reference image, tracking points corresponding to the feature points in the at least one comparative image using an optical flow technique, and generating a depth map according to correspondence-point tracking results.

9 Claims, 13 Drawing Sheets

FIG. 7
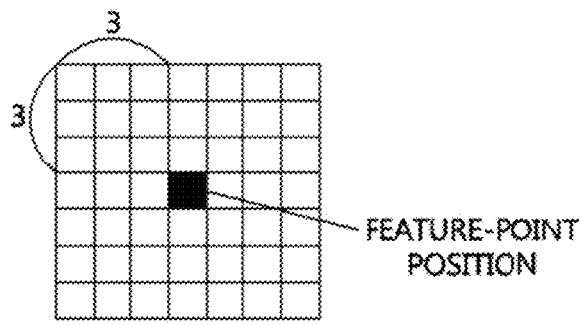
$W_x = 3$, $W_y = 3$ ∴ WINDOW SIZE = 7x7
(a)
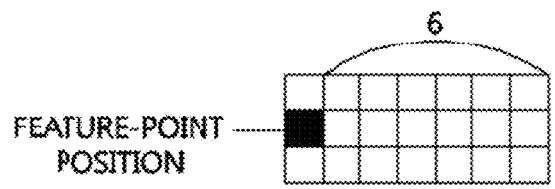
$W_x = 6$, $W_y = 1$ ∴ WINDOW SIZE = 7x3
(b)
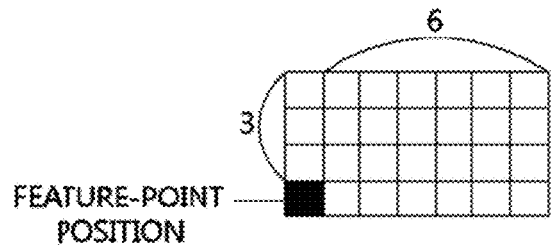
$W_x = 6$, $W_y = 3$ ∴ WINDOW SIZE = 7x4
(c)

METHOD AND APPARATUS FOR FEATURE-BASED STEREO MATCHING

CLAIM FOR PRIORITY

This application claims priority to Korean Patent Application No. 10-2011-0023400 filed on Mar. 16, 2011 in the Korean Intellectual Property Office (KIPO), the entire contents of which are hereby incorporated by reference.

BACKGROUND

1. Technical Field

Example embodiments of the present invention relate to a stereo matching method and apparatus for generating binocular disparity between pixels of left and right images, and more particularly to a method and apparatus for feature-based stereo matching capable of forming a depth map at a high speed without requiring calibration.

2. Related Art

In general, stereo matching refers to a process of obtaining an accurate, reliable disparity map by estimating disparity between correspondence points of two images obtained from different points of view using the same method as that of recognizing a distance of an object with two human eyes.

Further, it is possible to restore a three-dimensional (3D) image having a sense of depth by generating a depth map using the disparity map. Such stereo matching methods may be largely divided into area-based methods and feature-based methods. A feature-based method may be comparatively free from many of the limitations of an area-based method, thereby generating a more accurate, robust depth map. However, only a relatively sparse depth map can be generated in the feature-based method. Accordingly, in general, although the area-based method differs according to an application, it may be used to generate a dense depth map over the entire image. Therefore, the area-based method is preferred.

However, the area-based method requires a calibration process of constantly making an epipolar line consistent. Because depth values of all areas of an image are calculated, the area-based method requires a longer calculation time than the feature-based method. Under the assumption that the following conditions are satisfied, there is a disadvantage in that the stereo matching is performed.

A light source should be a point light source at an infinite distance.

An object within a scene should have a Lambertian surface.

Distortion in binocular color tones and characteristics should be comparatively small.

There are techniques for recognizing a user's gesture using active sensing technology using a time of flight (TOF) camera, an infrared ray (IR) laser, or the like as well as stereo matching. However, there is a disadvantage in that the TOF camera is very expensive and the laser may impose a burden on the user's eyes. Further, there is a problem in that high-precision processing technology is required because it is difficult to manufacture the TOF camera and the laser in a thin, compact size.

SUMMARY

Accordingly, example embodiments of the present invention are provided to substantially obviate one or more problems due to limitations and disadvantages of the related art.

Example embodiments of the present invention provide a method of feature-based stereo matching using compact, low-cost equipment without requiring calibration.

Other example embodiments of the present invention provide an apparatus for feature-based stereo matching using compact, low-cost equipment without requiring calibration.

According to example embodiments of the present invention, there is provided a method of stereo matching of a reference image and at least one comparative image captured from different points of view using a computer device, including: collecting the reference image and the at least one comparative image; extracting feature points from the reference image; tracking points corresponding to the feature points in the at least one comparative image using an optical flow technique; and generating a depth map according to correspondence-point tracking results.

Here, the method may further include: generating at least one image having lower resolution than an original image when images having various resolution levels are generated by decreasing the resolution of the original image according to each fixed step with respect to each of the reference image and the at least one comparative image, wherein the feature-point extraction and the correspondence-point tracking are started for a reference image having lowest resolution and a comparative image corresponding thereto and finally performed for a reference image having original resolution and a comparative image corresponding thereto.

Here, the extracting of the feature points may include: extracting points within a fixed ranking by calculating unique values of a gradient matrix G in positions of the reference image and arranging points in descending order for a smaller unique value between two unique values produced as calculation results.

Here, an approximate correspondence point may be found through a number of iterations by applying a Newton-Raphson method to the optical flow technique.

Here, the tracking of the points corresponding to the feature points may include configuring a feature-point tracking window for tracking points corresponding to the feature points in the reference image, and a size, a shape, and a center position of the feature-point tracking window may be changed according to previously provided information.

Here, the previously provided information includes at least one of a relative position and an arrangement interval between at least two cameras.

Here, the method may further include: separating foregrounds and backgrounds in the reference image and the at least one comparative image, wherein the reference image and the at least one comparative image are captured using an infrared illuminator, and the feature-point extraction and the correspondence-point tracking are performed for the foregrounds of the reference image and the at least one comparative image.

Here, the separating of the foregrounds and the backgrounds may include: separating an area having fixed luminance or more as the foreground in each image or separating a fixed ratio of each image as the foreground.

Here, the reference image and the at least one comparative image are captured by at least two cameras from different points of view at the same time.

According to other example embodiments of the present invention, there is provided a method for stereo matching of a reference image and at least one comparative image captured from different points of view using a computer device, including: collecting the reference image and the at least one comparative image; generating at least one image having lower resolution than an original image when images having various resolution levels are generated by decreasing the resolution of the original image according to each fixed step with respect to each of the reference image and the at least one comparative image, extracting first feature points from the reference image; tracking first correspondence points corresponding to the first feature points in the at least one comparative image using an optical flow technique; extracting second feature points from the at least one comparative image; tracking second correspondence points corresponding to the second feature points in the reference image using the optical flow technique; and generating a depth map by synthesizing tracking results of the first and second correspondence points, wherein the extraction of the first and second feature points and the tracking of the first and second correspondence points are started for images having lowest resolution and finally performed for images having original resolution.

Here, the extracting of the first and second feature points may include: extracting points within a fixed ranking by calculating unique values of a gradient matrix G in positions of the reference image and the at least one comparative image and arranging points in descending order for a smaller unique value between two unique values produced as calculation results.

According to other example embodiments of the present invention, there is provided an apparatus for stereo matching of a reference image and at least one comparative image captured from different points of view, including: an image collection unit configured to collect the reference image and the at least one comparative image; a feature-point extraction unit configured to extract points within a fixed ranking as feature points by calculating unique values of a gradient matrix G in positions of the reference image and arranging points in descending order for a smaller unique value between two unique values produced as calculation results when the feature points are extracted from the reference image; a correspondence-point tracking unit configured to track points corresponding to the feature points in the at least one comparative image using an optical flow technique; and a depth-map generation unit configured to generate a depth map using correspondence-point tracking results.

Here, the apparatus may further include: a resolution adjustment unit configured to generate at least one image having lower resolution than an original image when images having various resolution levels are generated by decreasing the resolution of the original image according to each fixed step with respect to each of the reference image and the at least one comparative image, wherein the feature-point extraction and the correspondence-point tracking are started for a reference image having lowest resolution and a comparative image corresponding thereto and finally performed for a reference image having original resolution and a comparative image corresponding thereto.

Here, the correspondence-point tracking unit may track points corresponding to the feature points in the reference image using a feature-point tracking window, and a size, a shape, and a center position of the feature-point tracking window may be changed on the basis of information regarding at least one of a relative position and an arrangement interval between at least two cameras.

Here, the apparatus may further include: a foreground/background separation unit configured to separate an area having fixed luminance or more or a fixed ratio of each image as a foreground when separating foregrounds and backgrounds in the reference image and the at least one comparative image, wherein the reference image and the at least one comparative image are captured using an infrared illuminator, and the feature-point extraction and the correspondence-point tracking using the optical flow technique are performed for the foregrounds of the reference image and the at least one comparative image.

Here, the apparatus may further include: a second feature-point extraction unit configured to extract second feature points from the at least one comparative image; and a second correspondence-point tracking unit configured to track second correspondence points corresponding to the second feature points in the reference image using the optical flow technique, wherein the depth-map generation unit generates a depth map by synthesizing second correspondence-point tracking results with the correspondence-point tracking results.

Here, the reference image and the at least one comparative image may be captured by at least two cameras from different points of view at the same time.

Here, the apparatus may be formed of a thin film and embedded in or attached to a liquid crystal display (LCD) of a computer.

BRIEF DESCRIPTION OF DRAWINGS

Example embodiments of the present invention will become more apparent by describing in detail example embodiments of the present invention with reference to the accompanying drawings, in which:

FIGS. 5A and 5B are conceptual diagrams illustrating other examples of results obtained by generating a depth map using the feature-based stereo matching method according to an example embodiment of the present invention;

FIG. 7 is a conceptual diagram illustrating a configuration of a feature-point tracking window according to an example embodiment of the present invention;

DESCRIPTION OF EXAMPLE EMBODIMENTS

Figure 1:
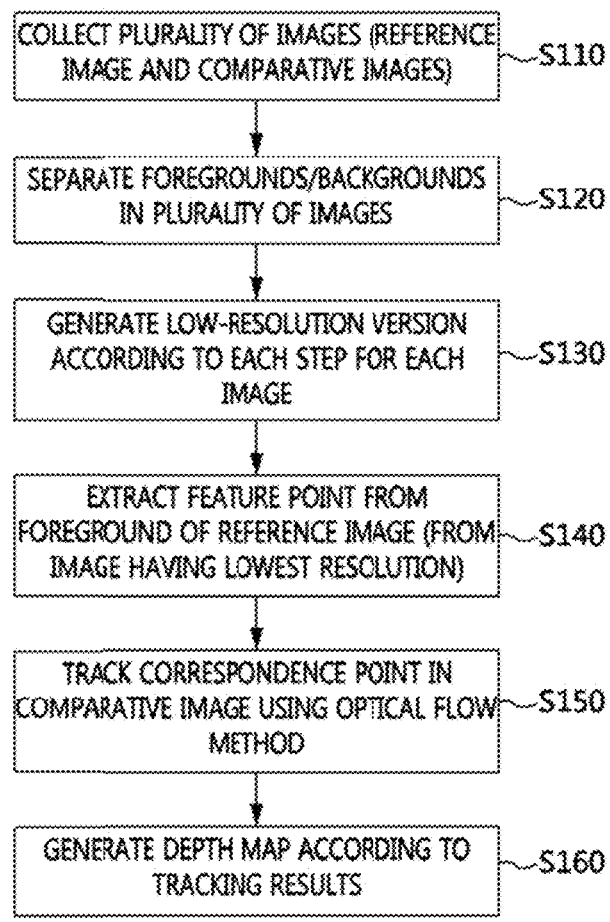
FIG. 1 is a flowchart illustrating a feature-based stereo matching process according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a feature-based stereo matching method and apparatus according to example embodiments of the present invention are disclosed. In the stereo matching method according to the example embodiment of the present invention, no epipolar line is obtained. Accordingly, it is not necessary to perform many complex software and hardware adjustments so as to perform calibration. In addition, a color tone or luminance value does not need to be fully consistent between captured binocular images. Although a sparse depth map is generated in the feature-based method, a depth map sufficiently available in many applications is generated and calculated at a speed available in real time.

The following two steps are largely performed for high-speed stereo matching without requiring calibration according to an example embodiment of the present invention.

1. A feature point capable of being tracked well in each image frame is found from a reference image.
2. A position corresponding to a previously found feature point is tracked in a comparative image using an optical flow technique.

In general, the optical flow technique is used to detect a moving direction of an image between neighboring frames from images generated with a time difference. For example, if the camera moves from the left to the right, a captured image moves from the right to the left and is sensed using the optical flow technique and a moving direction of the camera may be estimated. In addition, when the optical flow technique is used in the stereo matching method, stereo matching is generally performed using obtained information after an optical flow of a time difference is applied to each of left and right images.

However, the optical flow technique is applied to frames in spatial order rather than in temporal order in an example embodiment of the present invention. A reference image and a comparative image to be compared to the reference image are captured from different points of view at the same time, and the images contain a significant portion of the same object. This is not different from when an object of a still state is imaged twice in different positions using one camera. In addition, because the object is still, the object imaged in the two images is assumed to be a rigid body of which a shape change is absent. Accordingly, it can be seen that translation and a slight affine transform occur in the two images. Then, it is necessary to find a good feature point from a reference image and track the feature point well in a comparative image. This is a feature of the present invention for fast stereo matching.

Hereinafter, example embodiments of the present invention will be described in detail with reference to the accompanying drawings.

FIG. 1 is a flowchart illustrating a feature-based stereo matching process according to an example embodiment of the present invention.

Referring to FIG. 1, the feature-based stereo matching process or method according to the example embodiment of the present invention may include an image collection step S110, an image foreground/background separation step S120, an image resolution adjustment step S130, a feature-point extraction step S140, a correspondence-point tracking step S150, and a depth-map generation step S160.

The steps for the feature-based stereo matching according to the example embodiment of the present invention will be described with reference to FIG. 1.

The image collection step S110 is a step of collecting a plurality of images captured using a plurality of cameras. In the example embodiment of the present invention, one reference image of at least two images collected through at least two cameras and at least one comparative image are used. The reference image serves as reference for extracting a feature point, and the comparative image is used to find a point corresponding to the feature point extracted from the reference image.

The image foreground/background separation step S120 is used to more accurately analyze an image sensitive to backlight, a background, or the like by separating a foreground and the background in each of a plurality of collected images and tracking a feature point only in the foreground. Accordingly, this step is selectively applicable according to a situation.

The image resolution adjustment step S130 is a step of generating low-resolution versions of images having lower resolutions than an original image step by step with respect to each of the reference image and the comparative image. This is done to obtain a more accurate matching result by extracting a feature point from a low-resolution version of an image when the feature point is extracted and starting stereo matching from a state in which disparity between images is low. Its details will be described later.

The feature-point extraction step S140 is a step of finding a feature point capable of being tracked well from the reference image. The reference image may be pre-designated and arbitrarily designated in this step.

The correspondence-point tracking step S150 is a step of designating images other than the reference image as comparative images and tracking a position of a point corresponding to the previously found feature point in the comparative image. A method of tracking the feature point using the optical flow technique will be described later in further detail.

The depth-map generation step S160 is a step of restoring a 3D image by configuring a depth map according to a result of tracking the point corresponding to the feature point. The method according to the example embodiment of the present invention has an advantage in that the depth map may be formed without performing calibration.

Hereinafter, the stereo matching method using the optical flow technique according to the example embodiment of the present invention will be described in further detail.

Assuming that a parallel camera model is used in a simple example embodiment, a point tracked by the optical flow technique is relatively close to the camera if a distance between two images of the point is long, and is relatively far away from the camera if the distance is short. However, this does not mean that a general optical flow technique constantly ensures accurate tracking. For example, when images are captured by left and right cameras, a vertically formed object is usually tracked in a vertical direction rather than in a parallel direction. In this case, a method may also asymmetrically configure a window size to be used in an optical flow in a width and a height or configure the window size so that tracking is performed only on the left and right to a certain extent. However, a process of tracking features of binocular images very robustly and accurately will be described in an example embodiment of the present invention.

A general area-based stereo matching method directly uses a luminance value of an image. This is based on tan assumption that a color tone or a luminance value is substantially identical between binocular images and distortion between the two images is substantially absent. However, a color tone may be slightly different because of characteristics of cameras even when the same model of cameras are used and much effort is necessary to completely synchronize a color tone or a luminance value. Because a gradient distribution around a feature point, not an absolute luminance value, is used in the example embodiment of the present invention, an operation is possible without a large problem even when there is a slight binocular luminance or color difference.

First, I and J are assumed to be a reference image and a comparative image described above, and $I(\vec{x})=I(x, y)$ and $J(\vec{x})=J(x, y)$ are assumed to be luminance values of x and y coordinates of the images. Feature-point tracking for one point $u=[u_x\ u_y]^T$ in the reference image I is the same as finding $v=u+d=[u_x+d_x\ u_y+d_y]^T$ having J(v) similar to I(u) in a second image. If $w_x$ and $w_y$ are assumed to be values related to a window size, a motion difference d between the two images is a position difference when e is minimized in the following equation.

$$e(d) = e(d_x, d_y) = \sum_{x=u_x-w_x}^{u_x+w_y} \sum_{y=u_y-w_y}^{u_y+w_y} (I(x, y) - J(x+d_x, y+d_y))^2 \qquad (1)$$

Because x and y in which e(d) is minimized should be found, it is necessary to find a point satisfying the following equation.

$$\frac{\partial e(d)}{\partial d} = [0\ \ 0] \qquad (2)$$

When Equation (2) is expanded, the following equation is obtained.

$$\frac{\partial e(d)}{\partial d} = -2 \sum_{x=u_x-w_x}^{u_x+w_y} \sum_{y=u_y-w_y}^{u_y+w_y} (I(x, y) - J(x+d_x, y+d_y)) \left[\frac{\partial J}{\partial x} \frac{\partial J}{\partial y}\right] \qquad (3)$$

However, if d is very small as compared to the window size, Equation (3) may be expanded by a primary Taylor's expansion as follows.

$$\frac{\partial e(d)}{\partial d} \approx -2 \sum_{x=u_x-w_x}^{u_x+w_y} \sum_{y=u_y-w_y}^{u_y+w_y} \left(I(x, y) - J(x, y) - \left[\frac{\partial J}{\partial x} \frac{\partial J}{\partial y}\right]d\right)\left[\frac{\partial J}{\partial x} \frac{\partial J}{\partial y}\right] \qquad (4)$$

Here, $$\left[\frac{\partial J}{\partial x} \frac{\partial J}{\partial y}\right]$$

is a gradient vector of an image. Accordingly, if $$\nabla I = \begin{bmatrix} I_x \\ I_y \end{bmatrix} = \left[\frac{\partial J}{\partial x} \frac{\partial J}{\partial y}\right]^T$$

and $\delta I(x, y)=I(x, y)-J(x, y)$, Equation (4) may be rewritten as follows.

$$\frac{1}{2}\frac{\partial e(d)}{\partial d} \approx \sum\sum (\nabla I^T d - \delta I)\nabla I^T, \qquad (5)$$

-continued $$\frac{1}{2}\frac{\partial e(d)}{\partial d} \approx \sum\sum\left(\begin{bmatrix} I_x^2 & I_xI_y \\ I_xI_y & I_y^2 \end{bmatrix}d - \begin{bmatrix} \delta II_x \\ \delta II_y \end{bmatrix}\right),$$

where $$G = \sum\sum\left(\begin{bmatrix} I_x^2 & I_xI_y \\ I_xI_y & I_y^2 \end{bmatrix}\right)$$

If $$b = \begin{bmatrix} \delta II_x \\ \delta II_y \end{bmatrix},$$

Equation (5) is written as follows.

$$\frac{1}{2}\left[\frac{\partial e(d)}{\partial d}\right]^T \approx Gd - b \qquad (6)$$

Accordingly, Equation (6) is integrated by Equation (2) into the following Equation (7)

$$d_{opt} = G^{-1}b \qquad (7)$$

Accordingly, $$\frac{b}{G}$$

denotes an optimum d value, and a difference $d_{opt}$ is present between a point in the image I and a point in the image J. However, this is an equation using Taylor's expansion when d is sufficiently small. Accordingly, when d is large, the equation is not appropriate. However, d usually has a large value in the case of stereo matching. Accordingly, matching is not accurate if the general optical flow technique is directly applied to the stereo matching.

Figure 2:
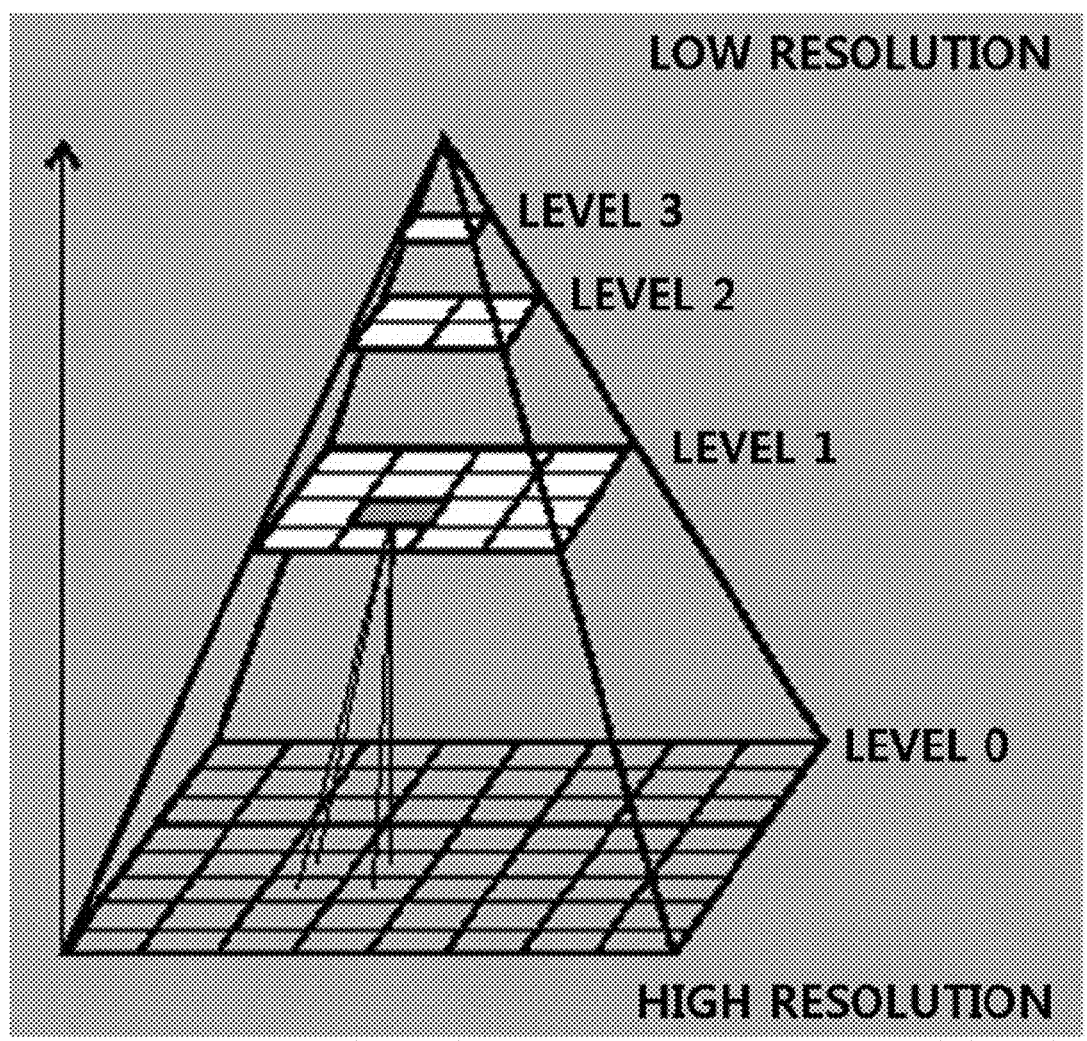
FIG. 2 is a conceptual diagram illustrating an image adjusted to have various resolutions according to an example embodiment of the present invention.

To solve the above-described problem, matching is performed from an image having lowest resolution after many low-resolution versions are created by reducing image resolution step by step as illustrated in FIG. 2 in this embodiment.

FIG. 2 is a conceptual diagram illustrating an image adjusted to have various resolutions according to an example embodiment of the present invention.

Referring to FIG. 2, it can be seen that different versions of images having resolutions from level 0 to level 3 are generated from one image. For example, level 0 is an initial image in a state in which the resolution is not adjusted, level 1 is an image obtained by decreasing the resolution by one step, level 2 is an image obtained by further decreasing the resolution of level 1 by one step, and level 3 is an image obtained by further decreasing the resolution of level 2 by one step.

Because disparity d between images may be reduced when the image resolution is reduced, a desired effect may also be obtained even when the stereo matching is performed using the optical flow technique. In addition, an approximate solution may be found by applying a Newton-Raphson approach and iterating the above-expressed equations a number of times so as to obtain an optimum solution. The Newton-Raphson approach is an estimation method that is slightly unstable but implements fast convergence.

In addition, in general, the feature-based stereo matching method uses points related to an edge, a line, and a corner so as to track feature points of an image. However, because these are only features expected to be tracked well, but do not actually ensure good tracking, it is important to take feature points that can be tracked well. In the case of a matrix G, which is a gradient matrix, tracking is designed to be performed well when a smaller value of unique values of the matrix G is large in the above equation. Accordingly, a feature point to be tracked well using a method described through the above equation may be a position (x, y) where a small unique value of the matrix G is large. In general, the small unique value is a smaller value between two unique values.

If unique values are calculated in positions of the image and a desired number of feature points are arranged in descending order for small unique values, the points may be a set of points of which the unique values are large in the image and may be points to be tracked well.

Hereinafter, various example images for results after the feature-based stereo matching method is applied as described above with reference to the drawings will be described. The stereo matching results using the above-described optical flow technique may be found in the images illustrated in FIGS. 3 to 6.

Figure 3:
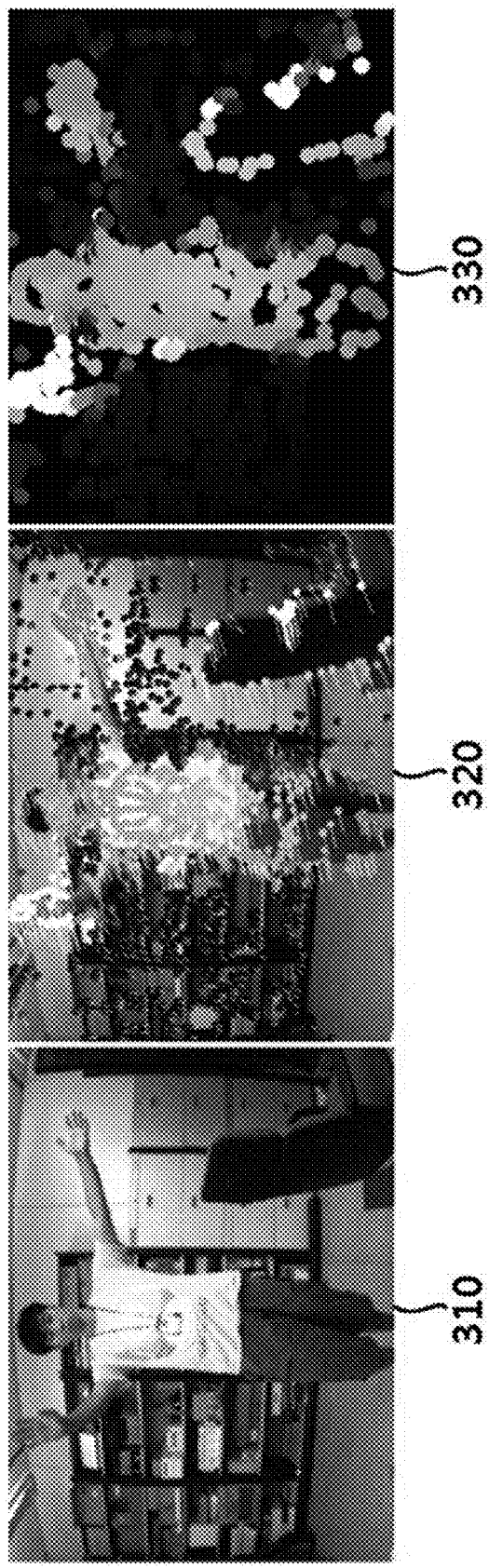
FIG. 3 is a conceptual diagram illustrating an example of results obtained by generating a depth map using the feature-based stereo matching method according to an example embodiment of the present invention.

FIG. 3 is a conceptual diagram illustrating an example of results obtained by generating a depth map using the feature-based stereo matching method according to an example embodiment of the present invention.

Referring to FIG. 3, a left image 310 is an original image and a middle image 320 shows a result obtained by tracking feature points in the original image. In the middle image 320, dark points are tracked as close points and bright points are tracked as distant points. A right image 330 is shown by configuring a depth map using these points. Its results are configured as points. Although the points seem to be inaccurate, it can be seen that these are good results in consideration of those obtained in real time from two cameras in which a color tone or luminance is slightly different without epipolar-line matching, rectification, and calibration.

Figure 4A:
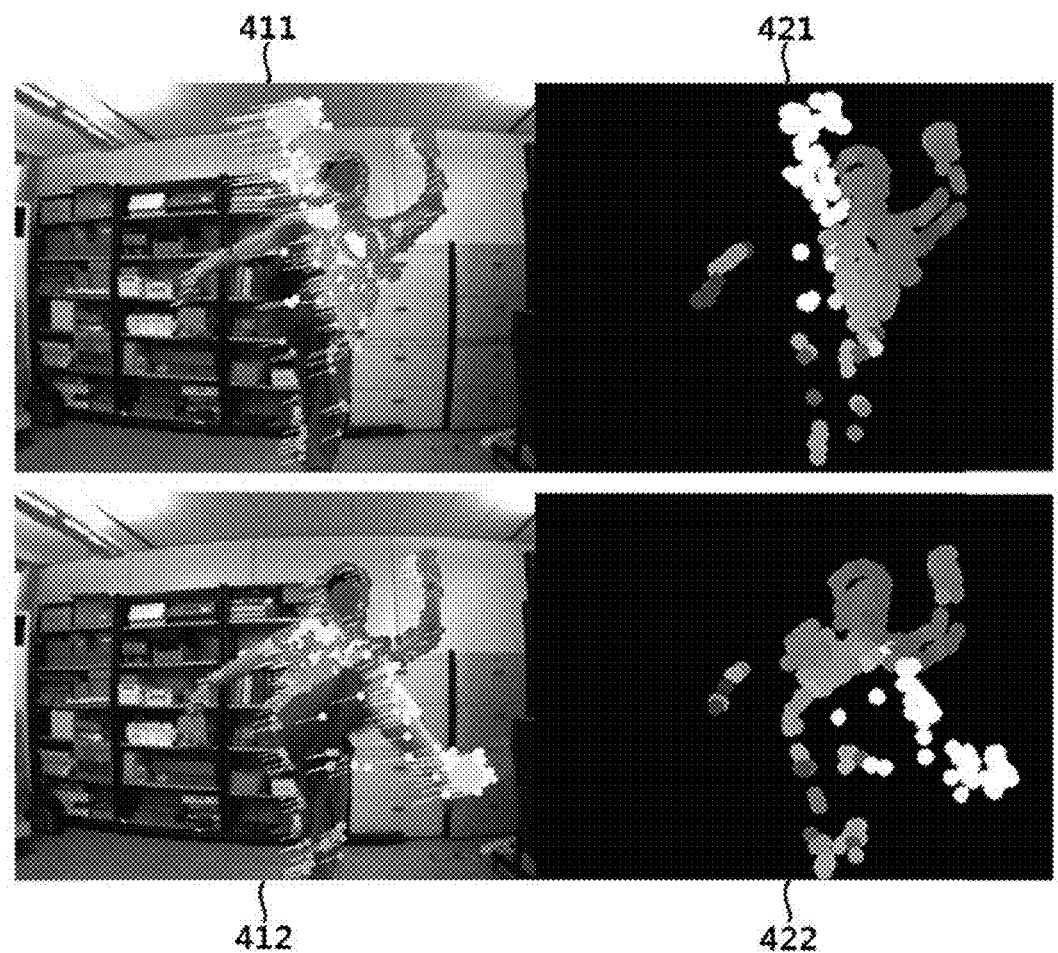
FIGS. 4A and 4B are conceptual diagrams illustrating examples of interactions between a user and computer using the feature-based stereo matching method according to an example embodiment of the present invention.
Figure 4B:
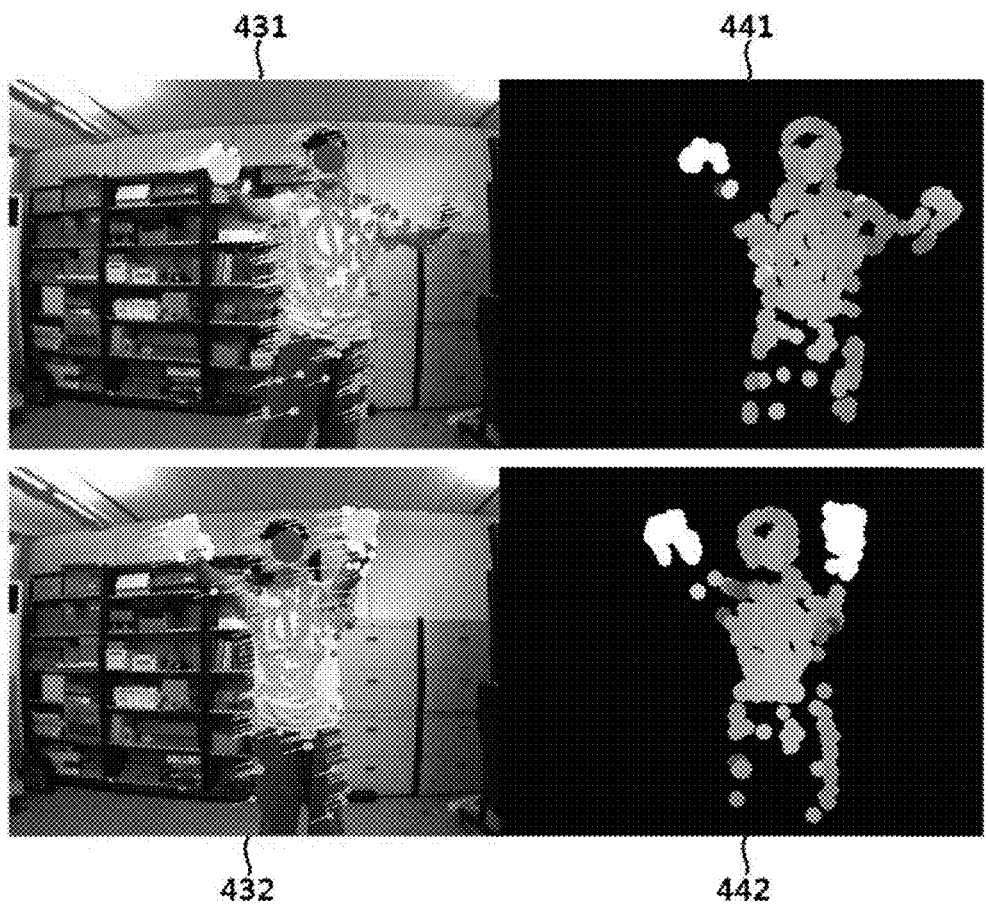

FIGS. 4A and 4B are conceptual diagrams illustrating examples of interactions between a user and computer using the feature-based stereo matching method according to an example embodiment of the present invention.

FIGS. 4A and 4B illustrate a process in which the computer mutually interacts with the user's motion while recognizing the user's motion by applying the feature-based stereo matching method according to the example embodiment of the present invention. In FIGS. 4A and 4B, left images 411, 412, 431, and 432 are original images, and right images 421, 422, 441, and 442 are depth maps generated from the original images using the optical flow technique according to the example embodiment of the present invention. Referring to FIG. 4A, it can be seen that the user is taking a kick action from the original images 411 and 412. In addition, it can be seen that the user is taking the kick action from the depth maps 421 and 422 generated in correspondence with the two original images 411 and 412. It can be seen that these results are implemented with accuracy at which sufficient interaction between the user and the computer is possible.

Figure 5B:
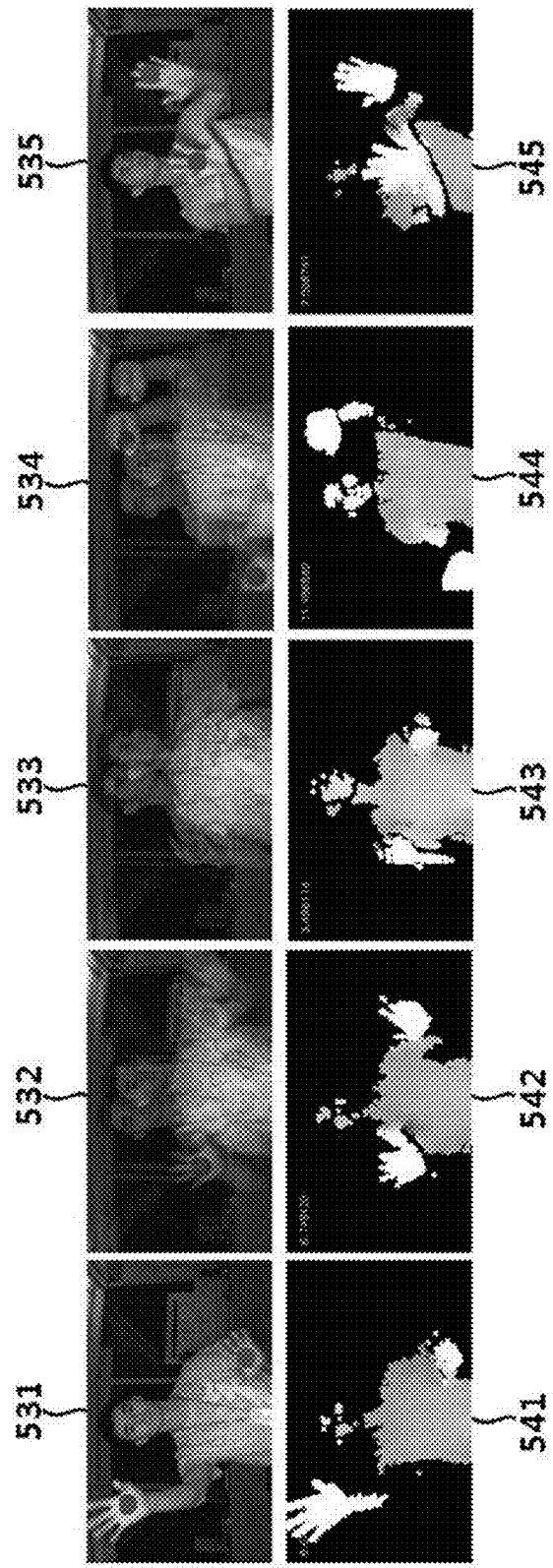

FIGS. 5A and 5B are conceptual diagrams illustrating other examples of results obtained by generating a depth map using the feature-based stereo matching method according to an example embodiment of the present invention.

In FIG. 5A, an original image captured by a camera is shown in a left image 510 in which a portion indicated by a white arrow in the rear is originally a straight line, but is displayed as a curve. In addition, an image 520 in which left and right images captured by the camera overlap is shown on the right, and it can be seen that a height of the user's eye is different. It can be seen that the images are not calibrated. FIG. 5B illustrates results obtained by performing stereo matching for the images using the optical flow technique.

Although upper images 531, 532, 533, 534, and 535 of FIG. 5B seem to be images in which corresponding actions having time differences overlap, these are overlapping images actually captured in different spaces at the same time, and positions of the user's two hands are found and indicated in red. In addition, depth maps generated from the images 531, 532, 533, 534, and 535 using the optical flow technique according to the example embodiment of the present invention are shown in lower images 541, 542, 543, 544, and 545. It can be seen that the depth maps of the lower images 541, 542, 543, 544, and 545 exactly express positions of hand portions indicated in red in the upper images 531, 532, 533, 534, and 535.

Figure 6:
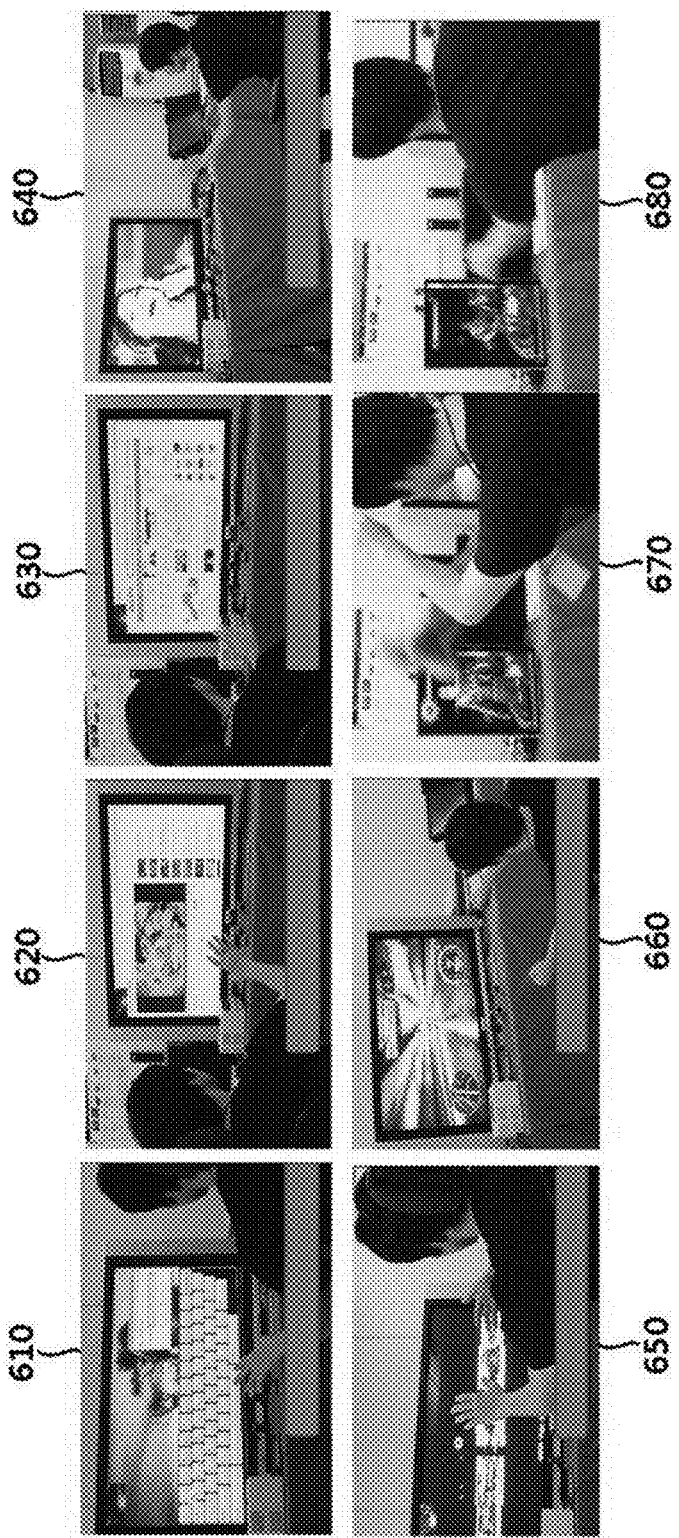
FIG. 6 is a conceptual example illustrating an example of an application of interactions between the user and the computer using the feature-based stereo matching method according to an example embodiment of the present invention.

FIG. 6 is a conceptual example illustrating an example of an application of interactions between the user and the computer using the feature-based stereo matching method according to an example embodiment of the present invention.

An image 610 in which a user inputs an identifier (ID) and a password by pressing a virtual keyboard using 3D motion, an image 620 in which the user performs a YouTube search using a gesture, and an Internet search image 630 are illustrated in FIG. 6. In addition, an image 640 in which the user moves a video in the front and rear using two hands while a moving image or a music video is reproduced, an image 650 in which many items are searched for using the two hands, and an image 660 in which the user enjoys a car racing game using the two hands are shown. In addition, images 670 and 680 in which the user enjoys a fighting game using his body are shown. From the images 670 and 680, it can be seen that the user enjoys content of the fighting game using his legs and head as well as his arms. It can be seen that finer interaction is also sufficiently possible when the stereo matching method according to the example embodiment of the present invention is applied.

The stereo matching method using the optical flow technique described above is an example proposed to help understanding, and any optical flow technique may be used. A feature of the present invention is stereo matching in which an existing optical flow technique applied to images having a time difference is applied to images having a space difference.

Hereinafter, techniques selectively configurable to more accurately perform the feature-based stereo matching according to an example embodiment of the present invention will be described.

If a minimum amount of information is known, more accurate tracking through a flexible configuration of a tracking window is possible. Hereinafter, further detailed embodiments in which the tracking window is configured will be described with reference to the drawings.

FIG. 7 is a conceptual diagram illustrating a configuration of a feature-point tracking window according to an example embodiment of the present invention.

As illustrated in (a) of FIG. 7, in general, $w_x$ and $w_y$ are configured to track a point corresponding to a feature point from the center of the window using the tracking window having a square shape.

However, if a comparison camera is on the right side of a reference camera, an appropriate tracking result should constantly correspond to tracking on the right side. In this case, when the window size is determined, an upper or lower detection range can be limited by reducing a vertical width of the window as illustrated in (b) of FIG. 7, and a position of a center point of the window may be adjusted so that a tracking start position of a feature point is leftmost and detection is performed only in a rightward direction.

In addition, if an interval between two cameras is known, an equation may be corrected so that a tracking distance is not very far heuristically. Likewise, when the comparative camera is installed slightly above the reference camera, a size and shape of the window and a position of the center point may be adjusted as illustrated in (c) of FIG. 7 so that detection is not performed in a downward direction. That is, it is possible to implement an optimum feature-based stereo matching method by adjusting the size and shape of the window or the position of the center point with a minimum amount of information provided in advance such as a relative position or interval of the camera.

On the other hand, it is difficult to accurately recognize the user's motion shown in an image when there is an influence of a background such as backlight. As a method of solving this problem, a method capable of performing stereo matching only for the foreground of an image by separating the foreground and the background of the image as described above in this embodiment will be described in further detail.

Figure 8:
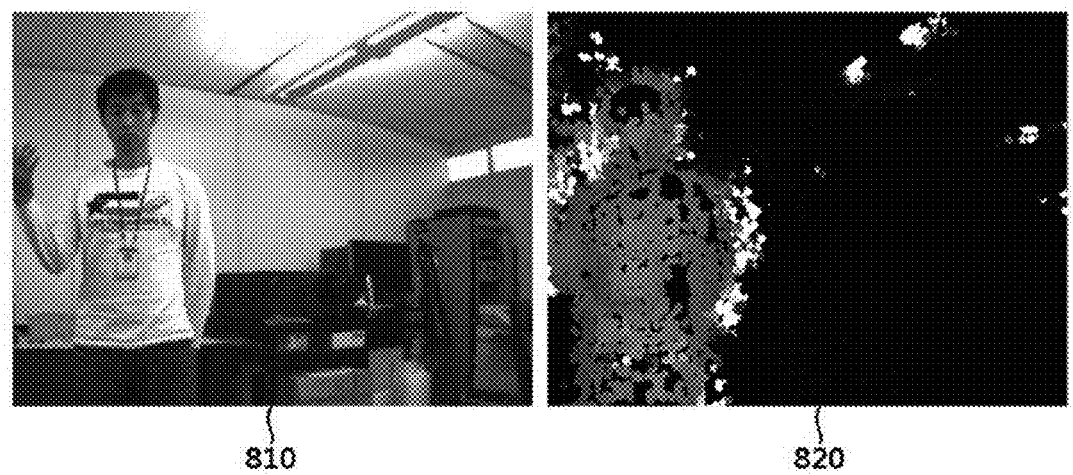
FIG. 8 is a conceptual diagram illustrating an example of an image affected by a background where there is backlight and stereo matching results.

FIG. 8 is a conceptual diagram illustrating an example of an image affected by a background where there is backlight and stereo matching results.

Figure 9:
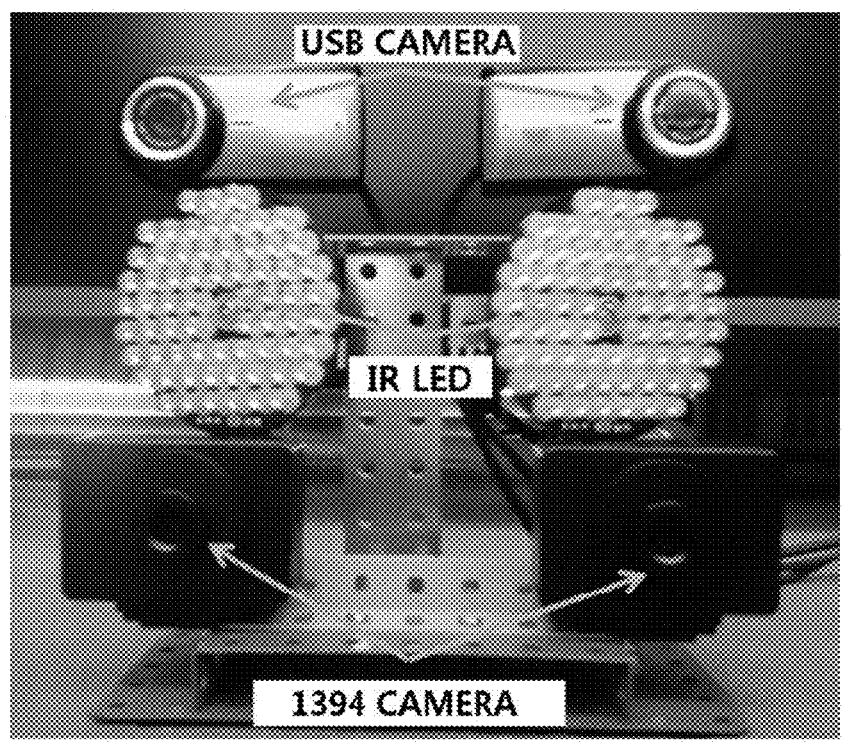
FIG. 9 is a conceptual diagram illustrating cameras to which IR illuminators are attached according to an example embodiment of the present invention.

FIG. 9 is a conceptual diagram illustrating cameras to which IR illuminators are attached according to an example embodiment of the present invention.

Referring to FIG. 8, a left image 810 is an original image, and a right image 820 shows a result obtained by generating a depth map from the original image. Referring to the left image 810, it can be seen that the user lifts his right hand and tucks his left hand behind his back. However, it is difficult to recognize the user's actual motion from only the right image 820, which is the depth map for the left image 810. This is because the user's 3D motion is not accurately recognized due to backlight behind the user.

Accordingly, a camera configuration as illustrated in FIG. 9 may be used for more robust 3D motion recognition. The camera configuration of FIG. 9 including an IR illuminator (IR LED) may separate the foreground and the background. That is, because the IR LED is attached to the camera, an area far away from the camera is darkly expressed. Accordingly, only the user's appearance, that is, the foreground, may be taken by removing an area having a fixed luminance value or less.

Here, the fixed luminance value may be applied on the basis of a luminance value determined by referring to a luminance value of each area for a predetermined time. Alternatively, a method of separating only a fixed ratio of an area as the foreground may be applied. As described above, the luminance value may be set to be variable with time or may be automatically designated. FIG. 9 illustrates an example of a camera configuration. Although both a camera of an Institute of Electrical and Electronics Engineers (IEEE) 1394 interface and a camera of a universal serial bus (USB) interface are mounted, a minimum configuration may include two image sensors (such as a charge-coupled device (CCD), a complementary metal-oxide semiconductor (CMOS), and the like) and an IR LED.

Although an asymmetrical method of selecting a feature point from a reference image and tracking the same position as the feature point in a comparative image is available as described above, a symmetrical method of finding feature points from the two images and tracking the feature point in the different images using an optical flow technique may also be used. Hereinafter, a method of tracking the feature points using the above-described symmetrical method will be described.

Figure 10:
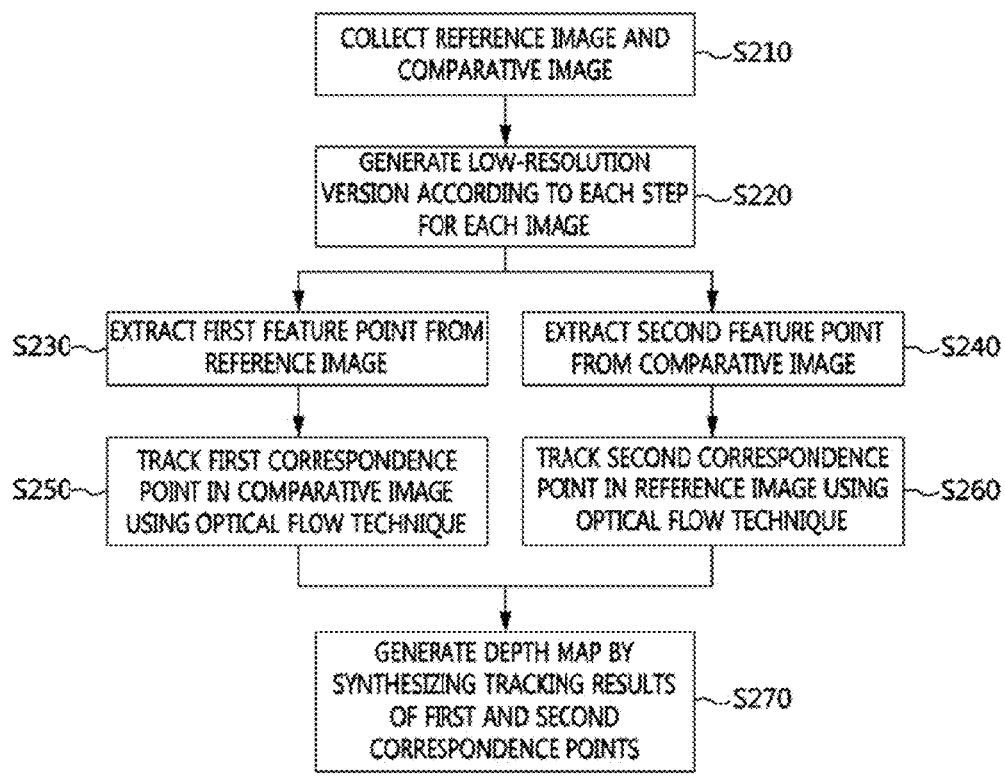
FIG. 10 is a flowchart illustrating a feature-based stereo matching process to which a symmetrical method is applied according to another example embodiment of the present invention.

FIG. 10 is a flowchart illustrating a feature-based stereo matching process to which the symmetrical method is applied according to another example embodiment of the present invention.

Referring to FIG. 10, the feature-based stereo matching process or method to which the symmetrical method is applied according to the other example embodiment of the present invention may include an image collection step S210, an image-resolution adjustment step S220, a first feature-point extraction step S230 for a reference image, a second feature-point extraction step S240 for a comparative image, a first correspondence-point tracking step S250 for the comparative image, a second correspondence-point tracking step S260 for the reference image, and a depth-map generation step S270.

The steps of the feature-based stereo matching process to which the symmetrical method is applied according to the other example embodiment of the present invention will be described with reference to FIG. 10.

The image collection step S210 is a step of collecting a plurality of images captured by a plurality of cameras using a computer. In the example embodiment of the present invention, images collected through two cameras are used.

The image-resolution adjustment step S220 is a step of generating various versions of images having lower resolutions than original images for the reference image and the comparative image. This is done to obtain a more accurate matching result by extracting a feature point from a low-resolution version of an image when the feature point is extracted and starting feature-point tracking from a state in which disparity between images is low.

The first feature-point extraction step S230 for the reference image and the second feature-point extraction step S240 for the comparative image are steps of finding a first feature point and a second feature point capable of being tracked well in the reference image and the comparative image.

The first correspondence-point tracking step S250 for the comparative image is a step of tracking a position of a first correspondence point corresponding to the previously found first feature point in the comparative image using the optical flow technique.

The second correspondence-point tracking step S260 for the reference image is a step of tracking a position of a second correspondence point corresponding to the previously found second feature point in the reference image using the optical flow technique.

The depth-map generation step S270 is a step of restoring a 3D image by generating a depth map using results of the previously performed tracking.

In the above-described symmetrical method, it is possible to perform the feature-point extraction and the correspondence-point tracking for the reference image and the comparative image in parallel or in sequence according to requirements. If the extraction and the tracking are performed in parallel, faster matching may be implemented, but a high-specification device may be required. In addition, a finer depth map may be generated in the above-described symmetrical method.

Hereinafter, a feature-based stereo matching apparatus according to an example embodiment of the present invention will be described with reference to the drawings.

Figure 11:
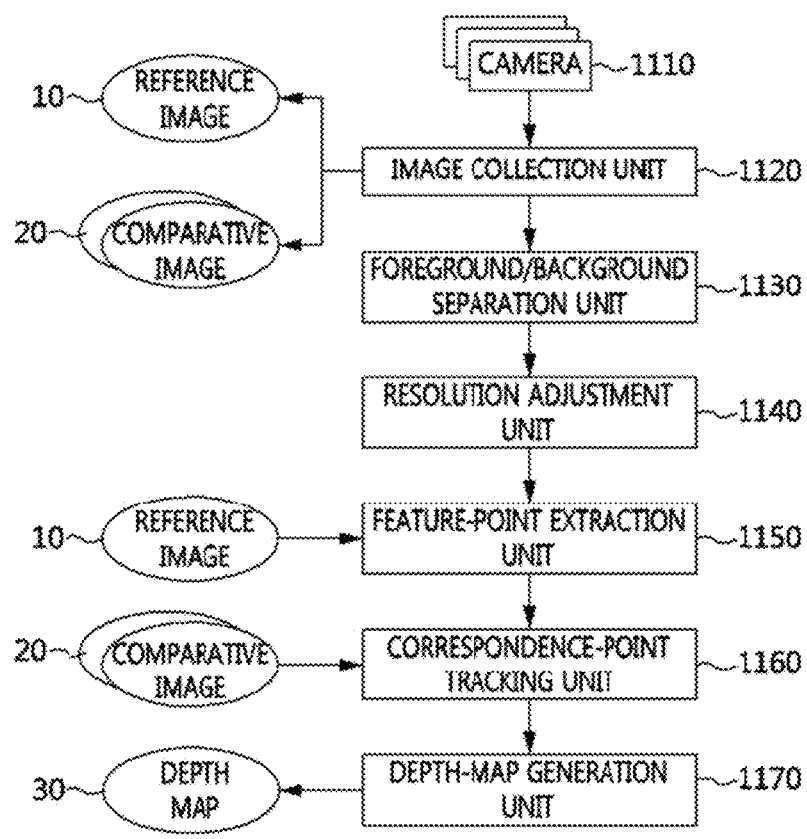
FIG. 11 is a conceptual diagram illustrating a feature-based stereo matching apparatus according to an example embodiment of the present invention.

FIG. 11 is a conceptual diagram illustrating the feature-based stereo matching apparatus according to the example embodiment of the present invention.

Referring to FIG. 11, the feature-based stereo matching apparatus according to the example embodiment of the present invention includes cameras 1110, an image acquisition unit 1120, a foreground/background separation unit 1130, a resolution adjustment unit 1140, a feature-point extraction unit 1150, a correspondence-point tracking unit 1160, and a depth-map generation unit 1170.

The components of the stereo-matching apparatus using the optical flow technique according to the example embodiment of the present invention will be described with reference to FIG. 11.

The cameras 1110 may be embedded in a computer in which the apparatus according to the example embodiment operates or externally installed to be connected to an outside. At least two cameras may be used. An IR LED may be embedded in, or attached outside of, each camera. According to the example embodiment of the present invention, a plurality of cameras may be installed to have a spatially fixed interval and configured to simultaneously perform imaging operations.

The image collection unit 1120 collects a plurality of images captured using a plurality of cameras. A reference image 10 is used as one image and a comparative image 20 is used as another image. The reference image 10 is used to extract a feature point, and the comparative image 20 is used to find a point corresponding to the feature point extracted from the reference image 10.

The foreground/background separation unit 1130 separates a foreground from a background in each of a plurality of collected images. This is done to more accurately analyze an image sensitive to backlight, the background, or the like by enabling the feature point to be tracked only in the foreground.

The image-resolution adjustment unit 1140 generates various versions of images having lower resolutions than original images for the collected reference image 10 and the collected comparative image 20 from which the foregrounds are separated. This is done to obtain a more accurate matching result by extracting a feature point from a low-resolution version of an image when the feature point is extracted and starting feature-point tracking from a state in which disparity between images is low.

The feature-point extraction unit 1150 extracts a feature point capable of being tracked well in the reference image 10, and the correspondence-point tracking unit 1160 tracks a position of a point corresponding to the previously found feature point using the optical flow technique in the comparative image 20. At this time, it is possible to faster or accurately find a correspondence point by adjusting a tracking window so that a correspondence-point search range is limited according to previously given information such as a camera position or an interval between cameras using the feature-point tracking window illustrated in FIG. 7.

The depth-map generation unit 1170 generates a depth map using a tracking result of a position corresponding to the feature point, and enables a depth map 30 to be formed at a high speed because no calibration is performed.

Now, a stereo matching apparatus to which the symmetrical method of finding a feature point and a correspondence point from two images is applied will be described.

Figure 12:
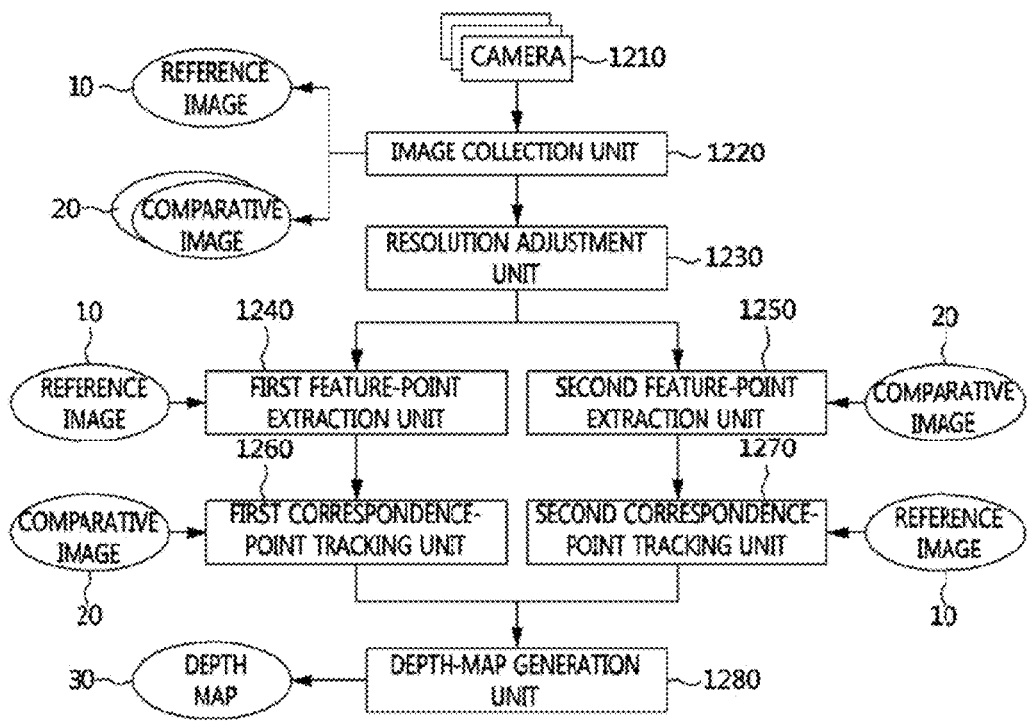
FIG. 12 is a conceptual diagram illustrating a feature-based stereo matching apparatus to which the symmetrical method is applied according to another example embodiment of the present invention.

FIG. 12 is a conceptual diagram illustrating a feature-based stereo matching apparatus to which the symmetrical method is applied according to another example embodiment of the present invention.

Referring to FIG. 12, the feature-based stereo matching apparatus according to the example embodiment of the present invention includes cameras 1210, an image collection unit 1220, a resolution adjustment unit 1230, a first feature-point extraction unit 1240, a second feature-point extraction unit 1250, a first correspondence-point tracking unit 1260, a second correspondence-point tracking unit 1270, and a depth-map generation unit 1280.

The components of the stereo-matching apparatus to which the symmetrical method is applied according to the example embodiment of the present invention will be described with reference to FIG. 12.

The cameras 1210 may be embedded in a computer in which the apparatus according to the example embodiment operates or externally installed to be connected to an outside. In this embodiment, two cameras are used, installed to have a spatially fixed interval, and configured to simultaneously perform imaging operations.

The image collection unit 1220 collects a reference image 10 and a comparative image 20 each captured using the two cameras.

The first feature-point extraction unit 1240 finds a first feature point capable of being tracked well in the reference image, and the second feature-point extraction unit 1250 finds a second feature point capable of being tracked well in the comparative image.

The first correspondence-point tracking unit 1260 tracks a position of a first correspondence point corresponding to the previously found first feature point in the comparative image using the optical flow technique.

The second correspondence-point tracking unit 1270 tracks a position of a second correspondence point corresponding to the previously found second feature point in the reference image using the optical flow technique.

The feature-point extraction units and the correspondence-point tracking units may sequentially perform second feature-point extraction and second correspondence-point tracking after first feature-point extraction and first correspondence-point tracking are completed according to requirements. Alternatively, the first and second feature-point extraction operations and the first and second correspondence-point tracking operations may be simultaneously performed.

The depth-map generation unit 1280 restores a 3D image by generating a depth map using feature-point extraction and correspondence-point tracking results.

Figure 13:
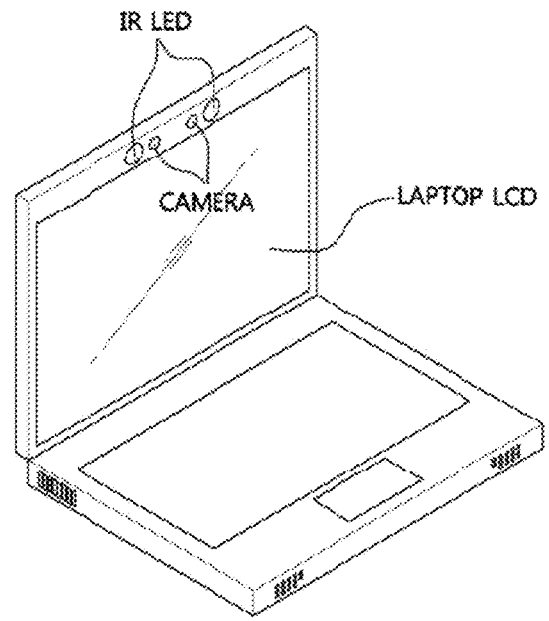
FIG. 13 is a conceptual diagram illustrating an example in which the stereo matching apparatus according to the example embodiment of the present invention is embedded in a computer.

In addition, because an apparatus according to an example embodiment of the present invention may be manufactured in the form of a thin film according to a structure of a necessary mechanism, the apparatus attached to an LCD side of a notebook computer as illustrated in FIG. 13 may use a 3D gesture interface.

If the feature-based stereo matching method and apparatus according to the example embodiments of the present invention are used, it is possible to quickly generate a stable depth map that is not sensitive to a color tone or luminance of a binocular image through feature-point tracking using an optical flow technique without having to perform calibration. In addition, it is possible to implement stereo matching having an improved feature-point tracking speed and accuracy by adjusting a shape or size of a tracking window using a minimum amount of information provided in advance such as relative positions or intervals of a plurality of cameras.

While the example embodiments of the present invention and their advantages have been described in detail, it should be understood that various changes, substitutions and alterations may be made herein without departing from the scope of the invention.

What is claimed is:

1. A method for stereo matching of a reference image and at least one comparative image captured from different points of view using a computer device, comprising:
   collecting the reference image and the at least one comparative image;
   extracting feature points from the reference image;
   tracking points corresponding to the feature points in the at least one comparative image using an optical flow technique; and
   generating a depth map according to correspondence-point tracking results,
   wherein the extracting of the feature points includes:
      extracting points within a fixed ranking by calculating unique values of a gradient matrix G in positions of the reference image and arranging points in descending order for a smaller unique value between two unique values produced as calculations results.

2. The method of claim 1, wherein an approximate correspondence point is found through a number of iterations by applying a Newton-Raphson method to the optical flow technique.

3. The method of claim 1, wherein:
   the tracking of the points corresponding to the feature points includes configuring a feature-point tracking window for tracking points corresponding to the feature points in the reference image, and
   a size, a shape, and a center position of the feature-point tracking window are changed according to previously provided information.

4. The method of claim 3, wherein the previously provided information includes at least one of a relative position and an arrangement interval between at least two cameras.

5. The method of claim 1, further comprising separating foregrounds and backgrounds in the reference image and the at least one comparative image,
   wherein the reference image and the at least one comparative image are captured using an infrared illuminator, and the feature-point extraction and the correspondence-point tracking are performed for the foregrounds of the reference image and the at least one comparative image.

6. The method of claim 5, wherein the separating of the foregrounds and the backgrounds includes separating an area having fixed luminance or more as the foreground in each image or separating a fixed ratio of each image as the foreground.

7. The method of claim 1, wherein the reference image and the at least one comparative image are captured by at least two cameras from different points of view at the same time.

8. A method for stereo matching of a reference image and at least one comparative image captured from different points of view using a computer device, comprising:
   collecting the reference image and the at least one comparative image;
   generating at least one lower resolution version of the reference image and at least one comparative image, having successively lower pre-determined resolution than the corresponding reference image and at least one comparative image;
   extracting first feature points from a version of the reference image;
   tracking first correspondence points corresponding to the first feature points in a version of the at least one comparative image using an optical flow technique;
   extracting second feature points from a version of the at least one comparative image;

tracking second correspondence points corresponding to the second feature points in a version of the reference image, using the optical flow technique; and generating a depth map by synthesizing tracking results of the first and second correspondence points, wherein the extraction of the first and second feature points and the tracking of the first and second correspondence points are started for images having lowest resolution and finally performed for images having original resolution.

9. The method of claim 8, wherein the extracting of the first and second feature points includes extracting points within a fixed ranking by calculating unique values of a gradient matrix G in positions of the reference image and the at least one comparative image and arranging points in descending order for a smaller unique value between two unique values produced as calculation results.

* * * * *